Sept. 13, 1966  S. L. WILLIAMS  3,272,152
APPARATUS FOR MAKING AND WRAPPING SOFT-CENTER CANDY SUCKERS
Filed Aug. 30, 1963  12 Sheets-Sheet 1

INVENTOR:
SHAFTER L. WILLIAMS
BY Frederick Breitenfeld
ATTORNEY

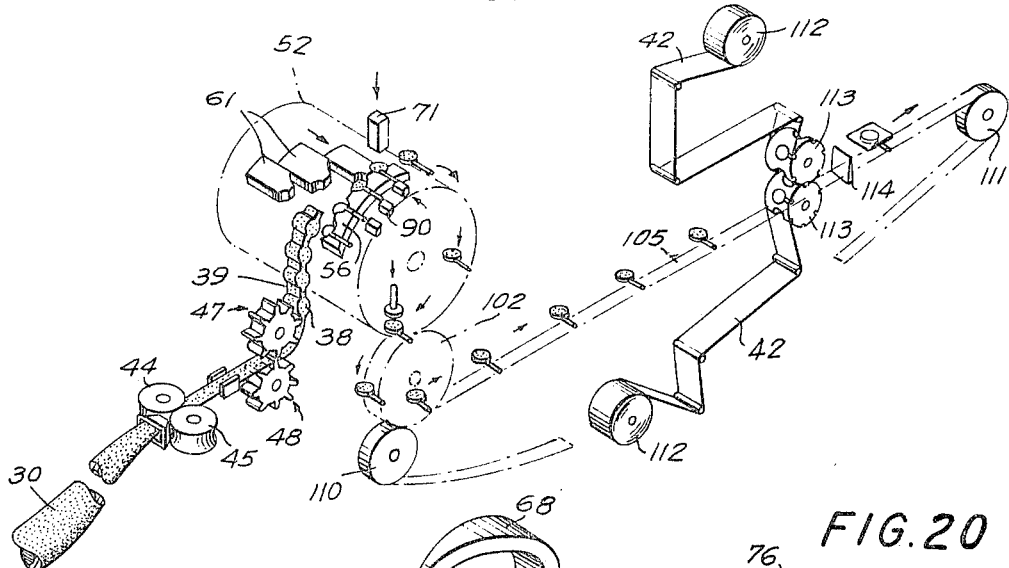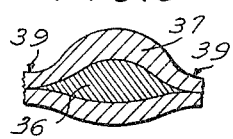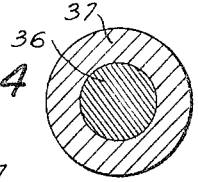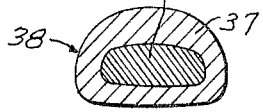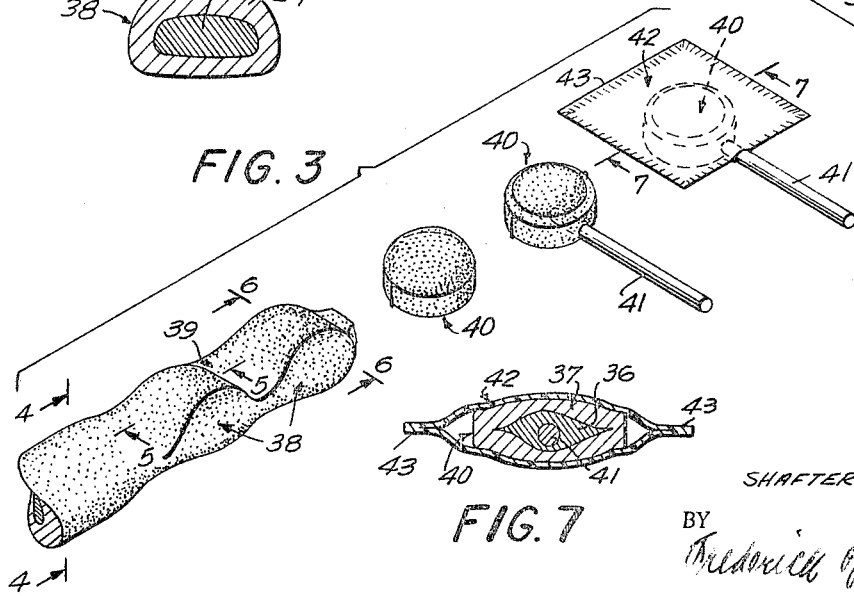

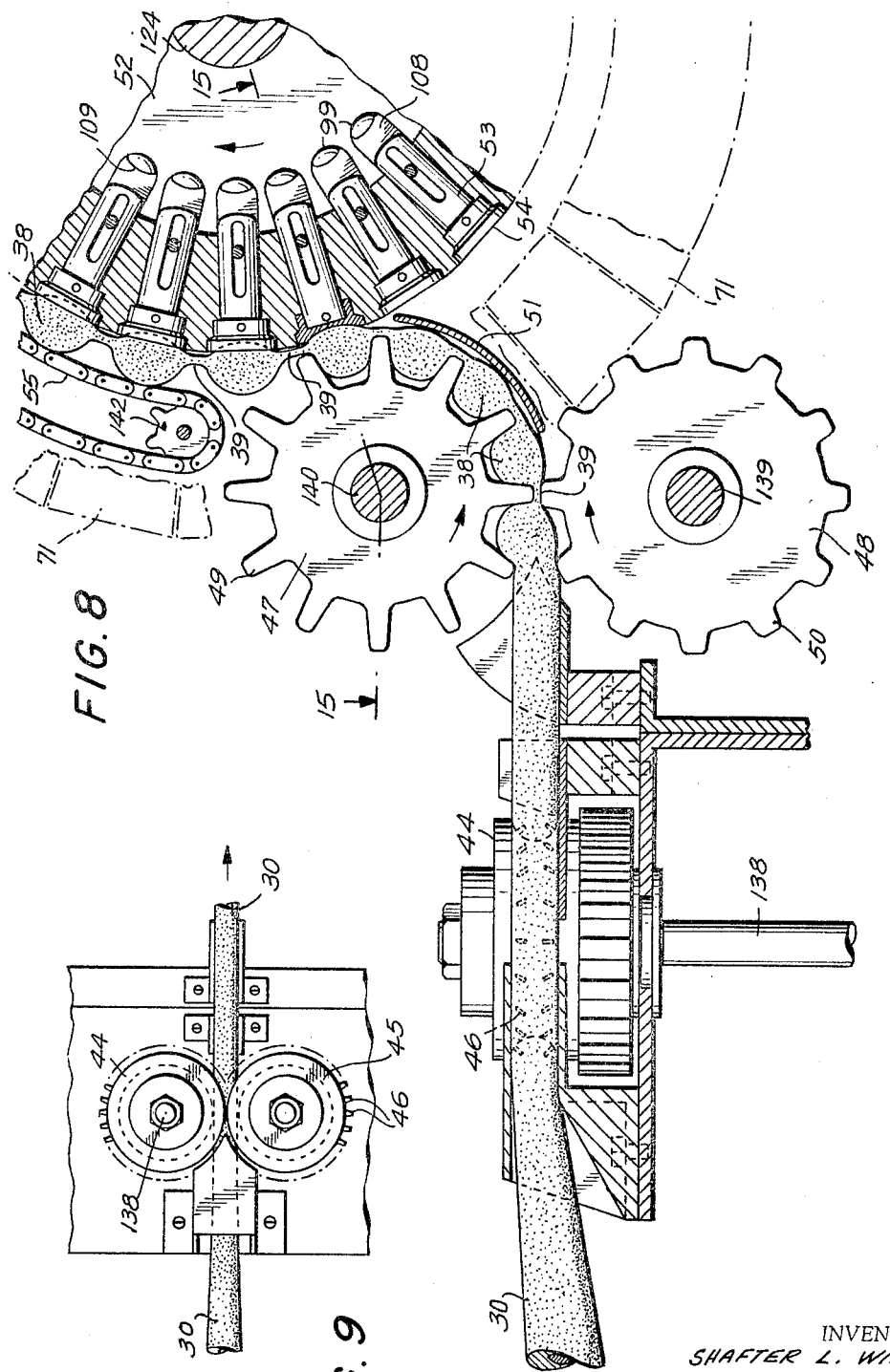

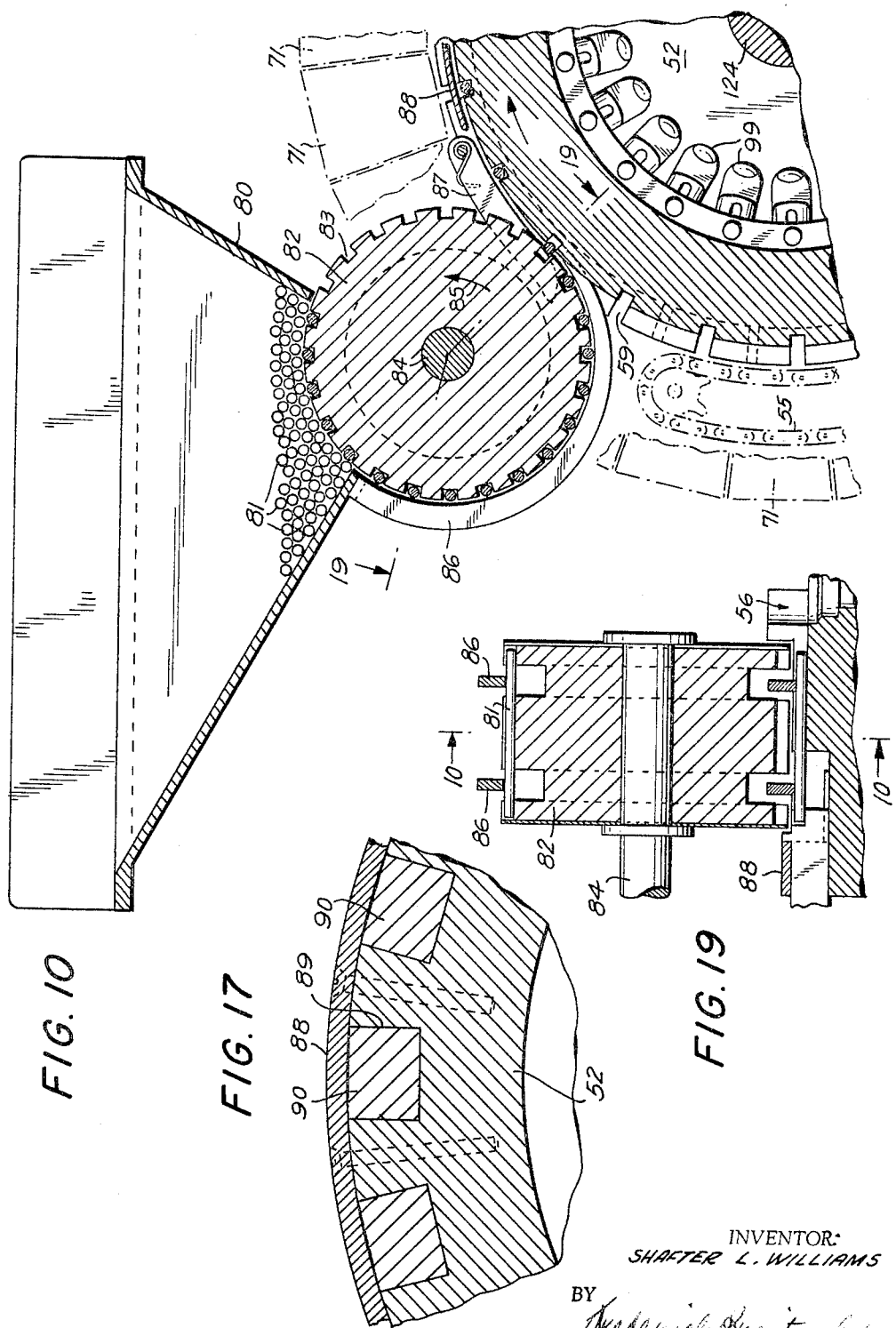

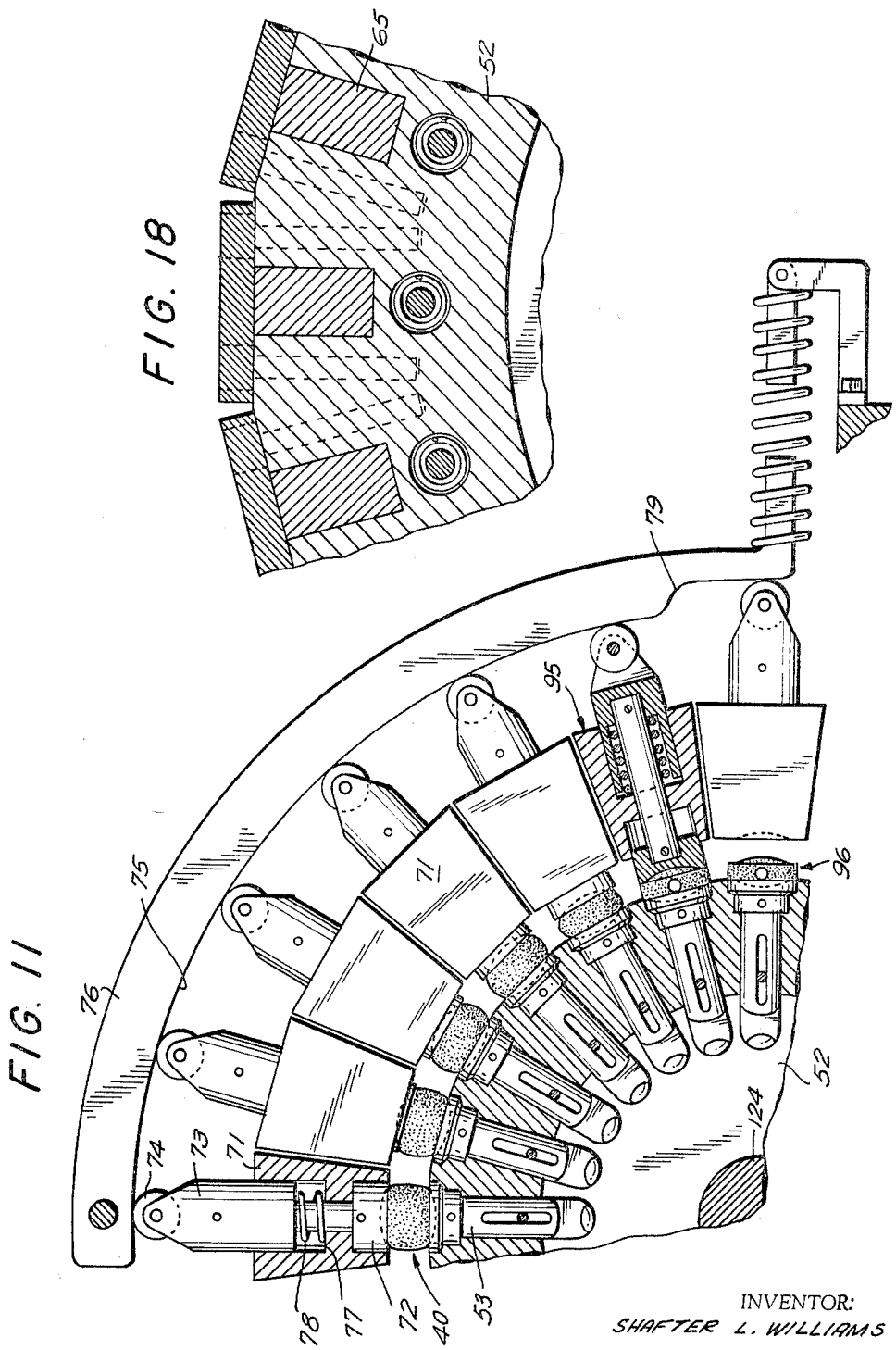

Sept. 13, 1966 S. L. WILLIAMS 3,272,152
APPARATUS FOR MAKING AND WRAPPING SOFT-CENTER CANDY SUCKERS
Filed Aug. 30, 1963 12 Sheets-Sheet 6
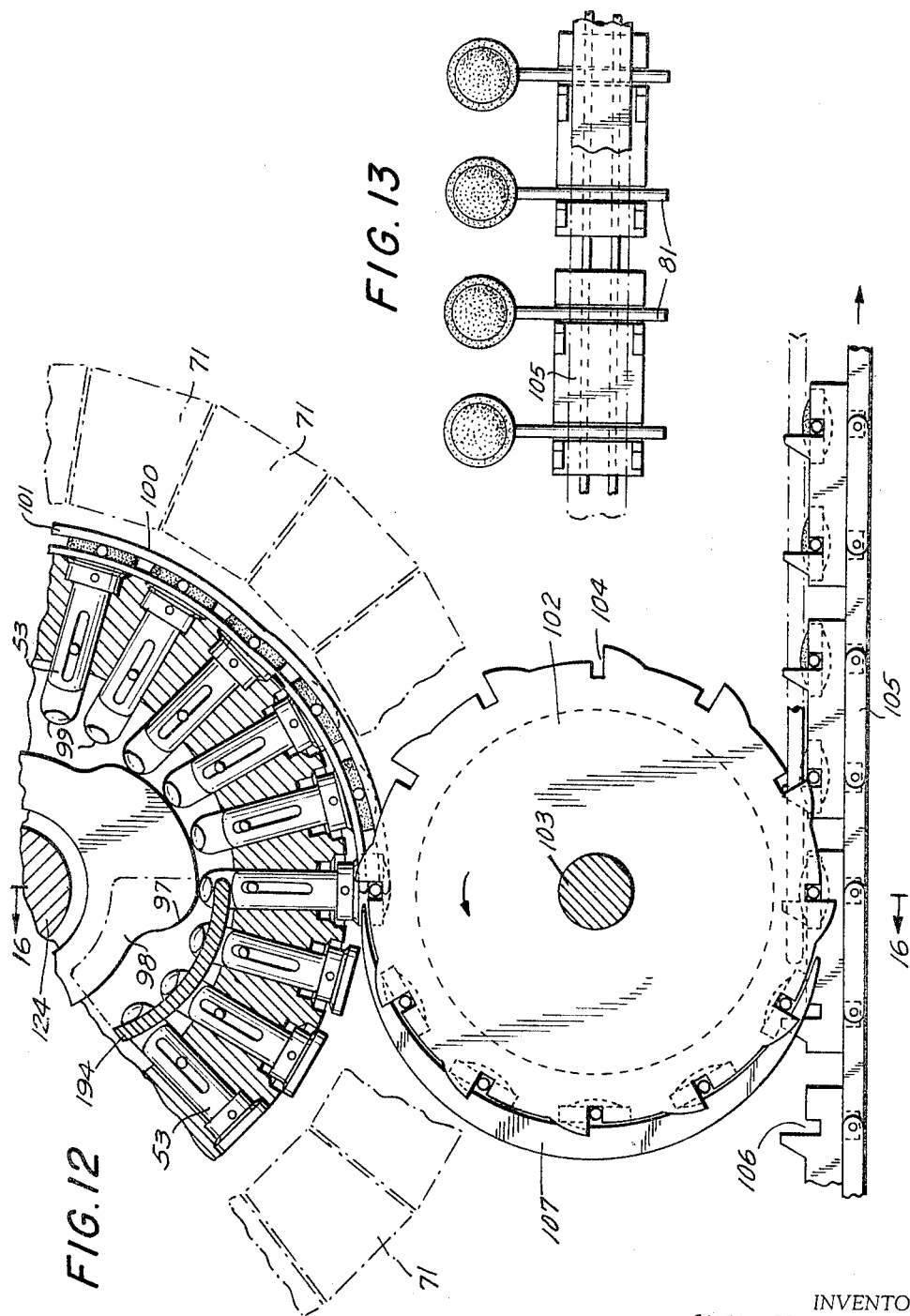
INVENTOR:
SHAFTER L. WILLIAMS
BY
ATTORNEY

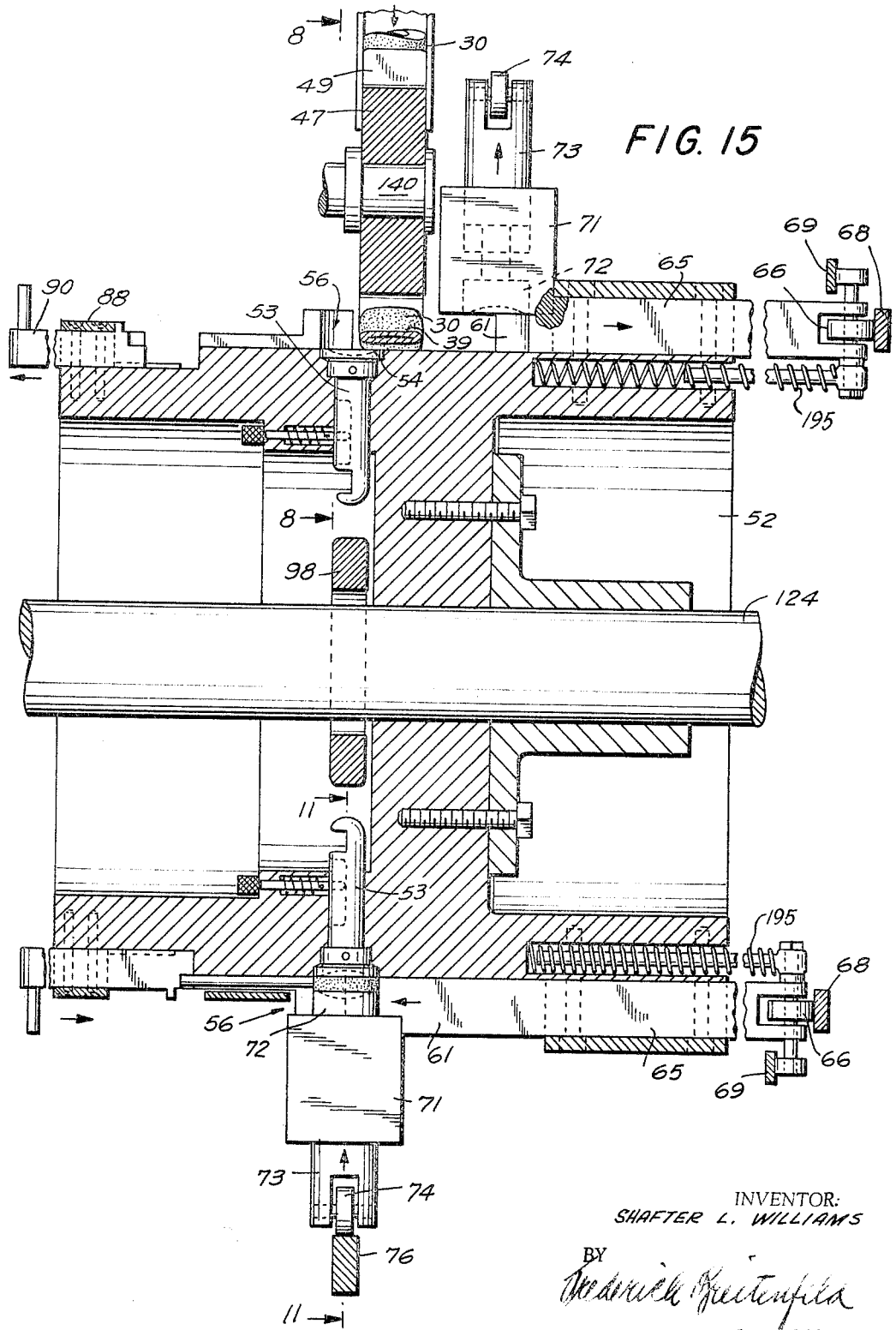

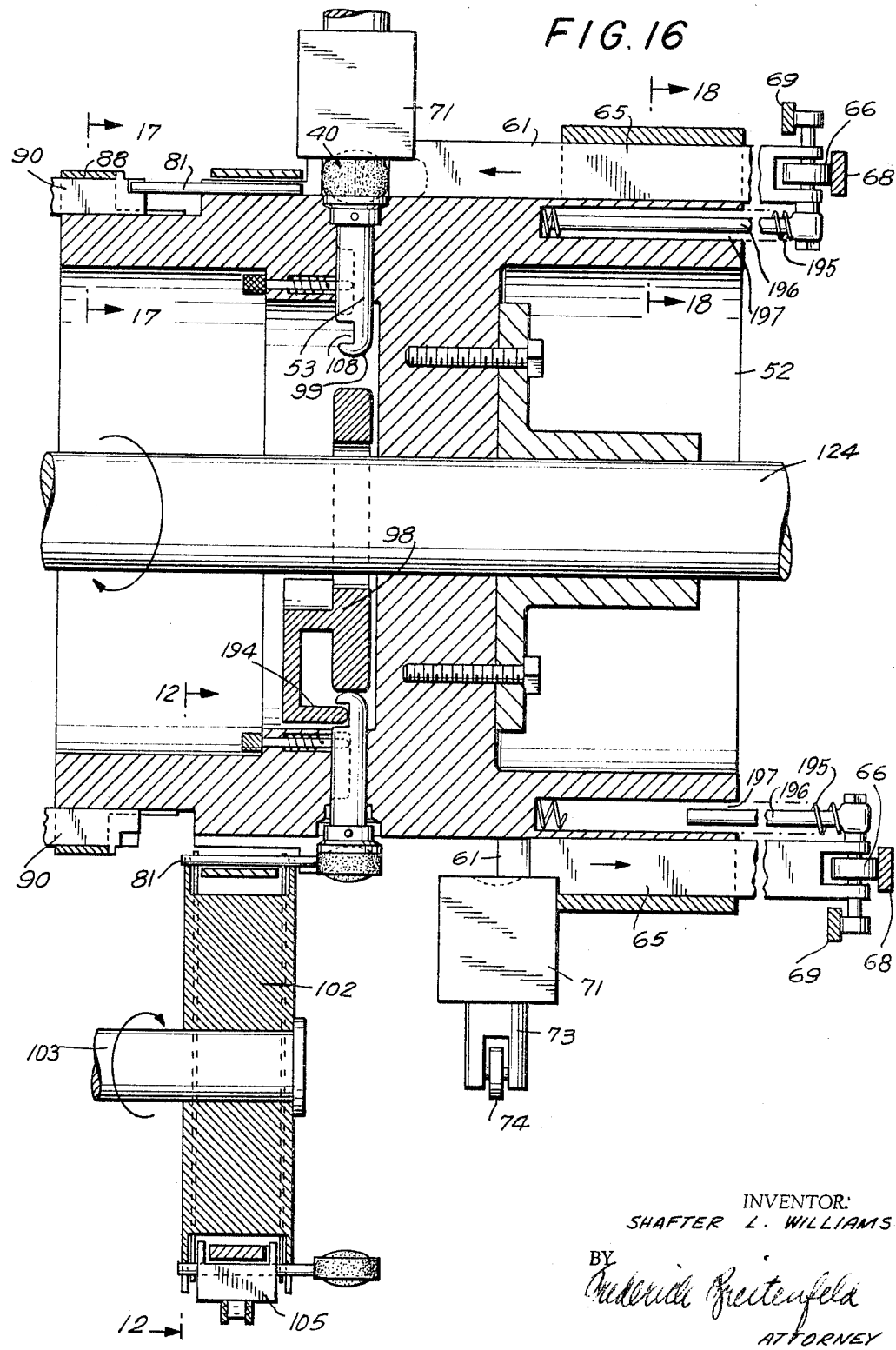

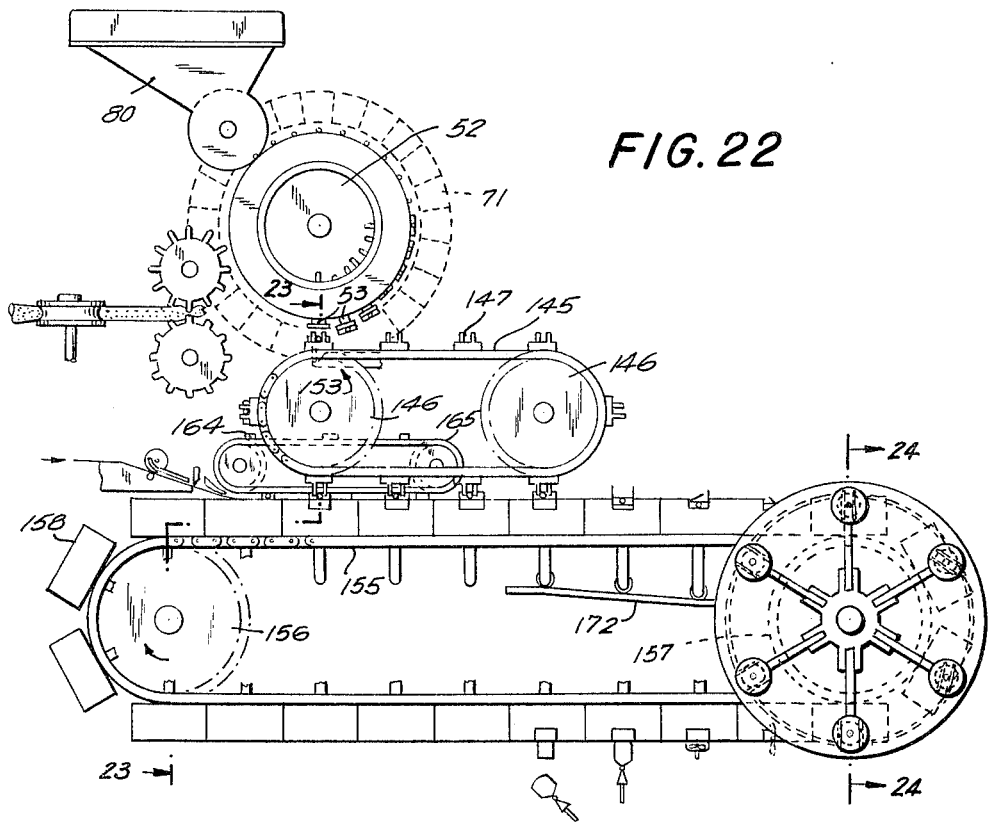
FIG. 22
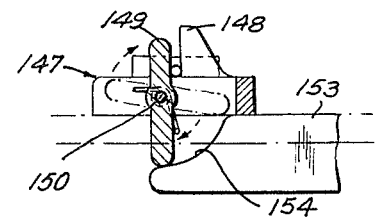
FIG. 27
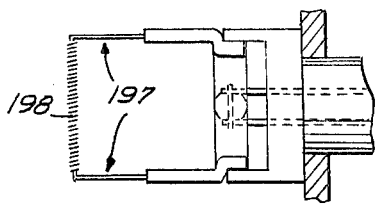
FIG. 25
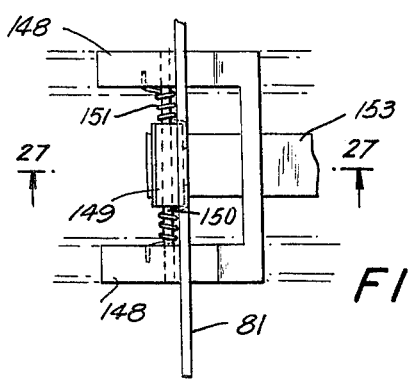
FIG. 26
INVENTOR:
SHAFTER L. WILLIAMS
BY Frederick Breitenfeld
ATTORNEY

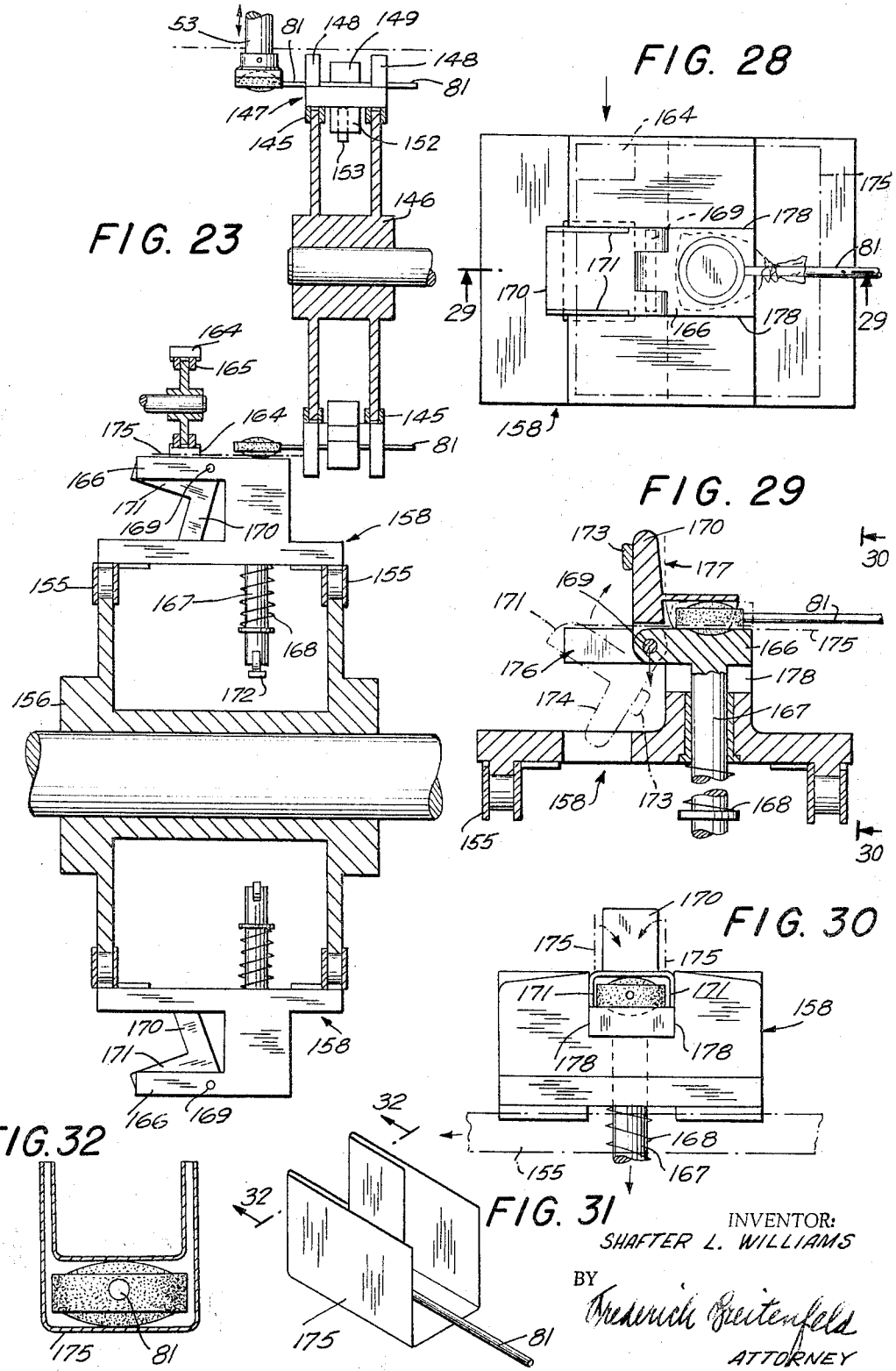

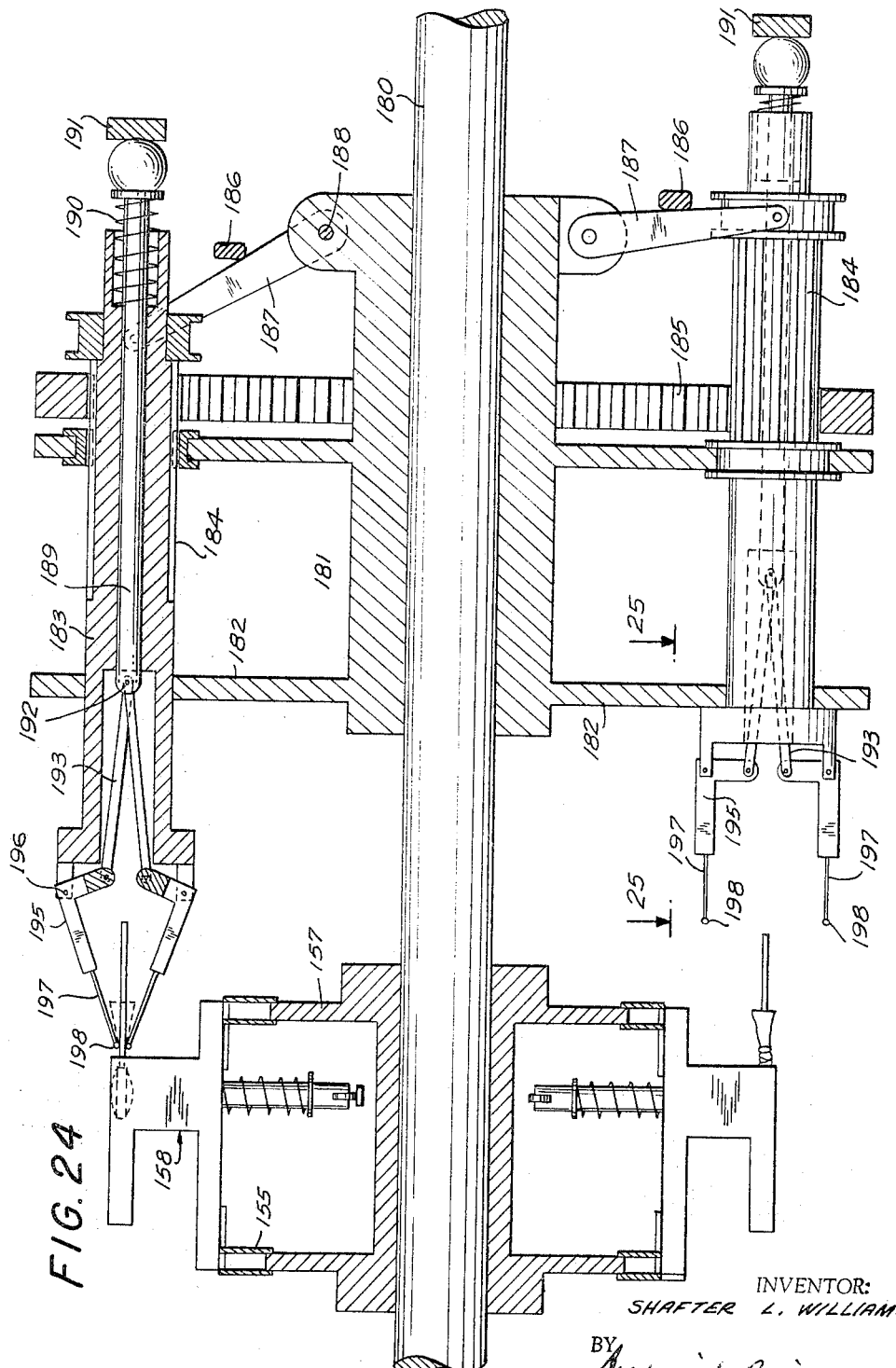

United States Patent Office 3,272,152
Patented Sept. 13, 1966

3,272,152
APPARATUS FOR MAKING AND WRAPPING
SOFT-CENTER CANDY SUCKERS
Shafter L. Williams, 1511 Myrtle Ave., Chesapeake, Va.
Filed Aug. 30, 1963, Ser. No. 305,682
10 Claims. (Cl. 107—4)

This invention relates generally to the manufacture of candy, and has particular reference to an improved method and apparatus for making and wrapping suckers mounted on sticks.

It is the general object of the invention to provide a procedure and an apparatus specially adapted to produce soft-center candy suckers, and to overcome the special problems involved in the manufacture and wrapping of such articles.

In the formation of conventional suckers, i.e., those composed of homogeneous or substantially homogeneous candy material, a rope of the candy in plastic condition is cut or chopped to produce successive slices of candy which are fed into appropriate molds. Such a procedure is not applicable to a rope in which there is a central core of soft readily flowable material, because the creation of each slice exposes the soft center, thus releasing it from the desired confinement. For this reason, among others, soft-center suckers have heretofore been manufactured by other methods involving reduced output, greater cost, and limitations with respect to the substances usable to form the soft central part of the resultant product.

A primary object of the present invention is to provide a procedure and apparatus whereby the rope technique can be satisfactorily employed for the manufacture of candy suckers having soft centers. Another object is to achieve the benefits stemming from this type of manufacturing procedure, including continuity of operation, uniformity of resultant product both as to shape and weight, and high-speed economical production.

Another object is to provide a method and apparatus which permits any of a wide variety of soft flowable materials to be used to form the centers of the pops.

A further object is to provide a method and apparatus in which the articles, including the partially-formed candy material, are in complete guided control from start to finish, thus avoiding the losses and delays frequently resulting from the use of machines in which sticky candy gobs or masses are temporarily disengaged, as in the process of slicing or chopping.

A still further object is to provide a method and apparatus which permits a wide range of wrapping materials to be applied, including not only those which are heat-sealable but also the more opaque wrappings such as waxed paper or glassine.

A general objective is to provide an apparatus that is thoroughly practicable on a commercial scale, relatively low in cost, and requiring a minimum of attendance.

The achievement of these objects is predicated, in part, upon a recognition of the special properties inherent in a candy rope composed of a substantially hard but ductile sheath and a core of relatively low viscosity. It has been found that treatment of such a continuous rope in gradual fashion, as distinguished from the relatively sudden action of a slicing or chopping instrument, allows separate candy sections to be produced in a reliable manner, in each of which a relatively soft center is thoroughly and completely enclosed within an outer sheath that is reliably form-retaining and tightly and neatly sealed.

A characterizing feature of the invention resides in the subjection of such a candy rope to a gradual squeezing or pinching of the rope at successive intervals to form a series of pillow-shaped sections connected by flat fins, then subsequently pinching each fin, in the direction of the plane within which it lies, to sever the fin. These pinching steps are performed in gradual fashion, whereby the soft center is first squeezed into the pillow-shaped sections as they are formed, and is then completely enclosed during the subsequent pinching and severance of the connecting fins.

The apparatus comprises, in general, a means for engaging a candy rope of the character described and progressively pinching it transversely, a means for engaging successive connecting fins and pinching the ends towards each other, a means for engaging and molding successive separated sections, a means for inserting a stick into each section, a means for transporting the resultant articles as they are formed to a wrapping station, and means at the wrapping station for enclosing the candy section of each sucker. The apparatus also includes mechanism for driving these instrumentalities in predetermined timed relation, so that the operation is entirely automatic. This makes it possible to operate the apparatus continuously, at relatively high speeds, with reliable output, in large quantities, of economically-produced uniform articles.

A preferred way of achieving these objects and advanatges, and such other objectives and benefits as may hereinafter appear, is illustrated in the accompanying drawings, in which:

FIGURE 2 is a schematic perspective view to illustrate the general nature of the operation;

FIGURE 3 is a schematic representation of the successive steps leading to the production of the final product;

FIGURES 4, 5, 6 and 7 are, respectively, enlarged cross-sectional views along the correspondingly numbered lines of FIGURE 3;

FIGURE 8 is a greatly enlarged fragmentary view, in the same direction as FIGURE 1, of the apparatus involved in performing the first pinching operation;

FIGURE 9 is a fragmentary plan view, on a reduced scale, of part of FIGURE 8;

FIGURE 10 is a view similar to FIGURE 8 showing the next sector of the main drum;

FIGURE 11 is a similar view of the next sector of the drum;

FIGURE 12 is a similar view of the next sector of the drum, showing how the articles are transferred from the drum to a special conveyor;

FIGURE 13 is a fragmentary plan view of part of FIGURE 12;

FIGURE 15 is an enlarged cross-sectional view, along substantially horizontal planes indicated at 15—15 of FIGURE 8;

FIGURE 16 is a similar cross-sectional view along a substantially vertical plane indicated at 16—16 in FIGURE 12;

FIGURE 17 is an enlarged fragmentary cross-sectional view along the line 17—17 of FIGURE 16;

FIGURE 18 is a fragmentary enlarged cross-sectional view substantially along the line 18—18 of FIGURE 16;

FIGURE 19 is a fragmentary cross-sectional view substantially along the line 19—19 of FIGURE 10;

FIGURE 20 is an exploded perspective view of the several cams involved in performing the operations;

FIGURES 22 is a general view of the sucker making apparatus embodying a wrapping method and mechanism of modified character;

FIGURE 23 is an enlarged fragmentary cross-sectional view along the line 23—23 of FIGURE 22;

FIGURE 24 is an enlarged cross-section along the line 24—24 of FIGURE 22;

FIGURE 25 is a detail view of one of the twisting fingers, at right angles to the representation of these fingers in FIGURE 24;

FIGURE 26 is a top view of one of the candy carriers on the transfer conveyor;

FIGURE 27 is a cross-section on line 27—27 of FIGURE 26;

FIGURE 28 is a top view of one of the wrapping heads;

FIGURE 29 is a cross-section on line 29—29 of FIGURE 28;

FIGURE 30 is an end view along line 30—30 of FIGURE 29;

FIGURE 31 is a perspective view to show a stage in the wrapping of a sucker; and FIGURE 32 is a cross-section on line 32—32 of FIGURE 31.

Figure 1:
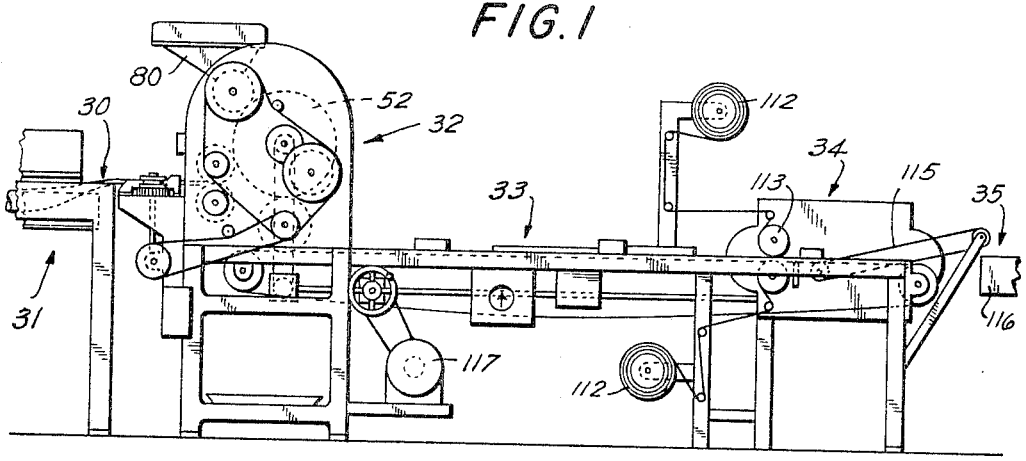
FIGURE 1 is a side elevational view of the apparatus as a whole.

In the machine as represented in FIGURE 1 the manufacturing procedure takes place from left to right. The desired candy rope 30 is formed in the region 31, and the suckers are formed in the apparatus designated 32. The finished suckers are transported in the region 33 to a wrapping station 34, and the wrapped articles are discharged at 35.

*Procedure in general*

As best shown in FIGURES 3 and 4, the candy rope 30 consists of a relatively soft readily flowable core 36 enclosed within a sheath 37 of relatively hard but ductile candy. Forming this rope does not constitute a part of this invention. It should be pointed out, however, that the sheath 37 is sufficiently firm in quality to prevent it from becoming unduly thinned as it is gradually kneaded down to substantially the external dimension desired. The center 36, however, may be of any desired soft flowable consistency. To facilitate the kneading operation, the rope may be warmed, but the material of the sheath is such that the warming does not materially affect its basic inherent firmness.

During the first gradual pinching procedure, the rope is distorted to form a series of successive pillow-shaped sections 38 (FIGURE 3) connected by transverse fins 39. During this distortion, the core material 36 is squeezed into the sections 38, and away from the fin 39, as best indicated in FIGURE 5. This action results from the gradual nature of the pinching operation, the firmness of the external candy material, and the ready flowability of the interior substance.

During the next pinching operation the fins 39 are pinched off and ultimately severed, thereby producing a separated section 40. Because of the gradual pinching, and because of the circumstance that very little, if any, of the soft center material was present within the confines of the fins 39, the body 40 consists of a soft center completely and firmly enclosed within a substantially firm outer wall.

The bodies 40, as shown in the present drawings, are substantially circular in shape, the peripheral surface being substantially cylindrical. Usually the opposite circular faces bulge slightly. This particular contour is not essential, however, and may be varied without departing from the basic procedural features of the invention.

At a subsequent stage, i.e. after completion of the pinching operation, each body 40 is associated in impaled relation to a stick 41, and finally the candy section of the product is wrapped in an enclosure 42. The wrapping shown in FIGURES 3 and 7 consists of a pair of opposed substantially square sheaths of heat-sealable material, lying on opposite sides of the body 40 and having their margins heat-sealed as indicated at 43 in FIGURE 7. This type of wrapping is not necessarily the only kind that can be employed, as will be pointed out hereinafter.

*Sizing*

In FIGURES 8 and 9 the rope 30 is shown approaching and passing between a pair of sizing rollers 44, 45. These rollers have concave peripheries and are rotated in opposite directions so that as the candy rope 30 passes between them it is squeezed to a final external diameter in accordance with predetermined plan. These rollers are preferably adjustable with respect to each other so that the desired external dimension imparted to the candy rope can be varied to suit different requirements.

Advantageously the surfaces of the rollers 44, 45 may be provided with projections indicated at 46, whereby a gripping action is produced so that the rope is positively advanced as it passes this sizing station.

*First pinching*

As the rope 30 emerges from between the rollers 44, 45, it enters the nip of a pair of toothed wheels 47, 48. The teeth 49 on the periphery of the wheel 47 have blunted ends which come into face-to-face proximity, respectively, with the similarly blunted teeth 50 on the wheel 48. The teeth 50 are purposely of lesser depth than the teeth 49.

As each pair of opposed teeth engage the rope 30 they squeeze the rope in a gradual fashion which causes it to bulge into a pillow-shaped formation, each such section occupying the space between adjacent teeth 49. During this squeezing action, as hereinbefore mentioned, the soft center of the rope is squeezed into the bulbous section.

The teeth 49, 50 do not come into actual contact, as a result of which a series of sections 38 are formed, connected by webs or fins 39. Through an arc of about 90 degrees these sections 38 are held in engagement with the wheel 47 by means of a guide plate 51.

*Second pinching*

Figure 14:
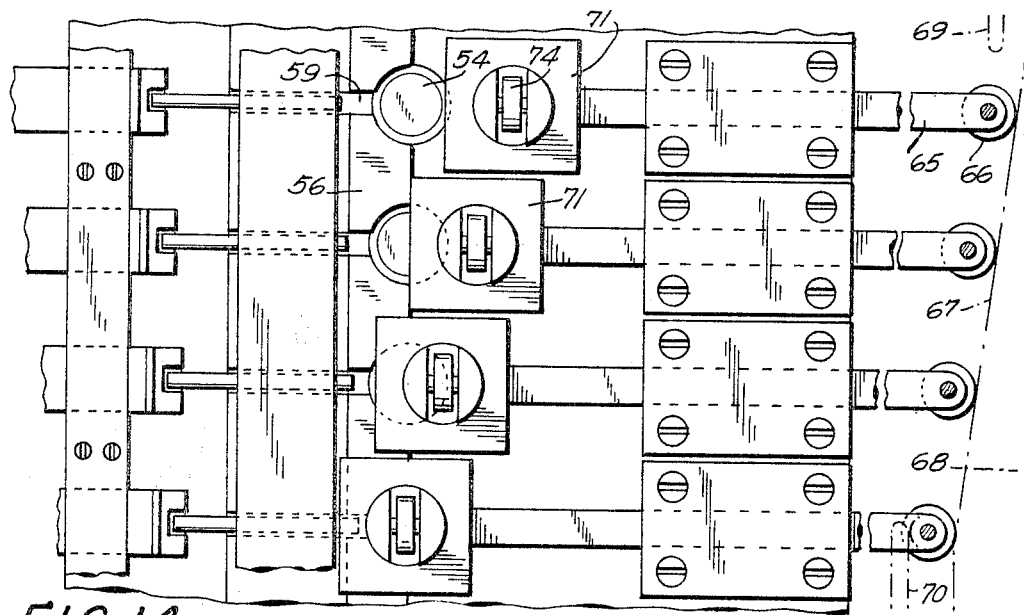
FIGURE 14 is a fragmentary view of developed character, of part of the drum surface, showing successive positions of certain parts.
Figure 14A:
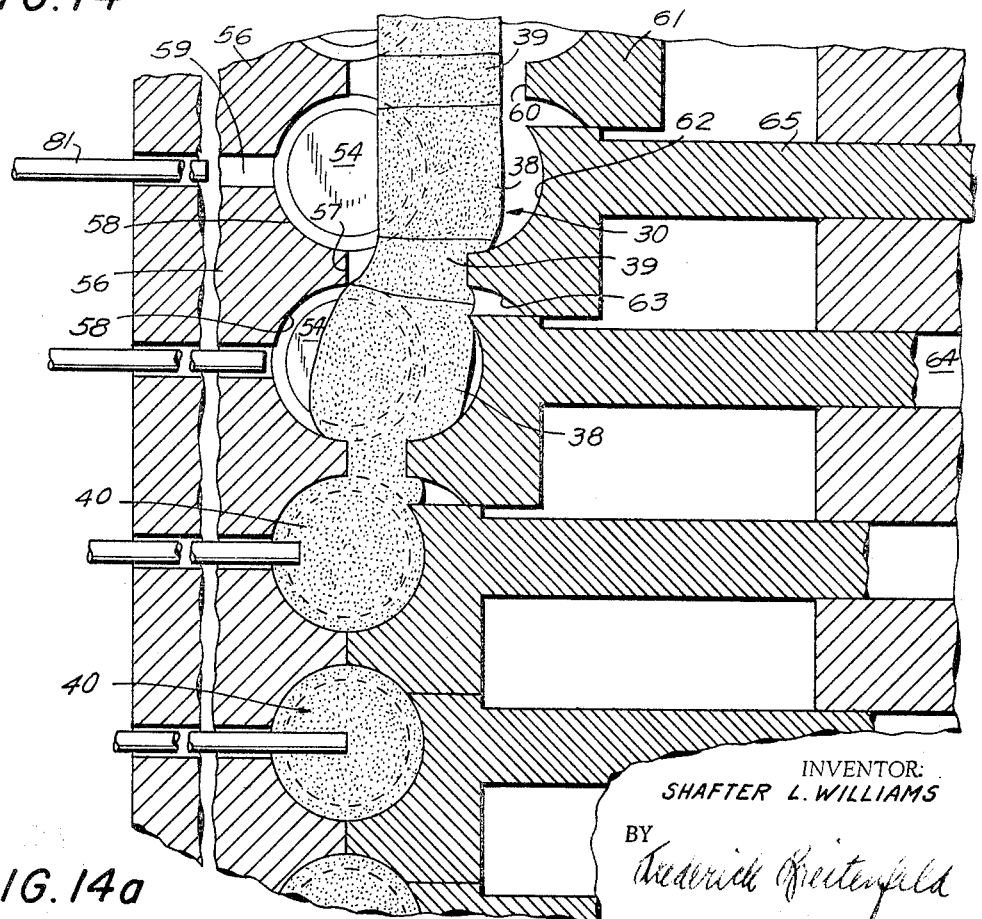
FIGURE 14a is a view similar to FIGURE 14, on an enlarged scale, with parts of FIGURE 14 omitted to reveal the underlying second set of pinching elements.

The wheel 47 guides the segmented rope into tangential relation to a main drum 52. This drum is provided with a series of built-in molding elements 53 arranged in radial dispositions, each of them presenting a dished cavity 54 on the periphery of the drum. The parts are so dimensioned that as the segmented rope comes into engagement with the periphery of the drum 52, the bulbous sections 38 are adjacent to the cavities 54, respectively. However, as best shown in FIGURE 14a, they are not directly over these cavities but are laterally offset. A moving chain or similar guide 55 retains the sections 38 against the drum 52.

On the periphery of the drum a series of lateral pinching elements is provided. These elements are arranged in pairs, and one set is positionally fixed while the other set is relatively movable with respect thereto. This is best indicated in FIGURE 14a, in which the pinching elements 56 are the fixed ones. Each has an attenuated but blunted end 57, and concave side edges 58 lying in concentric relation to the mold cavities 54. The pinching elements 56 are spaced from one another, to provide transverse slots 59 adapted to receive the sticks, as will be pointed out hereinafter.

The attenuated ends 57 of the pinching elements 56 lie in alignment with the centers of the cavities 54. In opposed relation to each pinching surface 57 is a similar attenuated end 60 on the corresponding movable element 61. Each of the latter elements is similarly provided with concave sides 62 and 63, but whereas the fixed pinching elements 56 are symmetrical, the movable elements 61 are asymmetrical so that the curved sides 63 are substantially shorter than the curves 62.

The movable elements 61 move in sequence toward the fixed pinching elements 56, and in the course of this movement the fins 39 are engaged at their opposite sides and pinched together, the pinching elements ultimately coming into complete contact as shown at the lower part of FIGURE 14a. During this procedure the fins 39 are distorted to an extent that squeezes them out of existence, the candy material being pressed tightly against the adjacent bodies, now completely separated. This produces a firm enclosure for the soft center of each body, and produces the smooth cylindrical surfaces previously described in connection with FIGURE 3.

When the pinching dies 56 and 61 are together, the curvatures 62 and 63 lie concentrically with respect to the cavities 54, and the separated candy sections lie directly within the cavities 54.

The offset relationship of the rope 30 to the cavities 54 when it first comes into contact with the periphery of the drum 52, and the eccentric arrangement of the movable elements 61 with respect to the cavities 54 produces the desired distortion and ultimate severance to the fins 39 in the desired manner.

*Molding*

The pinching elements 61 are mounted for sliding movement within grooves or guide ways 64 formed in the drum 52. The slidable parts 65 terminate at their rear ends in cam followers 66 adapted to bear against and be guided by the operative surface 67 of a cam 68 having the general shape best indicated at the left end of FIGURE 20. Cooperating with this cam is a second cam 69 which engages another set of appropriate cam followers so as to move the parts 65 in the opposite direction as the followers bear against the operative face 70 of the cam 69. The movement of the slidable parts 65 toward the left in FIGS. 15 and 16 is effected by means of cams 68 and 69, and the parts 65 are returned toward the right by the force exerted by compression springs 195 which surround rods 196 disposed within bores 197 in drum 52.

Thus, as the drum 52 rotates, the cams 68 and 69 function to move the movable pinching elements 61 toward and away from the fixed pinching elements 56 in a predetermined sequence. The movement of the pinching elements toward each other takes place within the "north-west" sector of travel, as the machine is depicted in the present drawings, i.e., the movable pinchers 61 start to move toward the fixed elements 56 as soon as the candy rope comes into contact with the drum periphery, and the pinching action is completed by the time the uppermost position of FIGURE 11 is reached. The return movement, controlled by the cam surface 70, is initiated at the "eastern" point shown at the lower end of FIGURE 11.

Also mounted on the parts 65 are a series of radially disposed carriers 71 in each of which a molding element 72 is mounted for reciprocating movement. Whenever the pinching elements 56 and 61 have come together (as indicated at the lower end of each of FIGURES 14 and 14a) the molding elements 72 are in direct alignment with the molding elements 53, and in opposed relation thereto. Each element 72 has a rear part 73 provided with a cam follower 74. The followers 74 ride against and are guided by the operative surface 75 of an arcuate cam 76 best illustrated in FIGURE 11, also in FIGURE 20. As will be observed in FIGURE 11, the cam 75 gradually moves each part 73 radially toward the center of the drum, whereby the candy segment squeezed between the cavity 54 and the mold part 72 will be compressed to the desired ultimate shape.

Each carrier 71 is provided with an outwardly directed shoulder 77, and a compression spring 78 bearing against this shoulder and against the part 73 operates to withdraw the mold element 72 as the recessed part 79 of the cam surface 75 becomes effective.

The exposed face of each mold element 72 may be dished, as shown, or any other desired contour of configuration can be imparted to it. The same is true with respect to the outer faces of the cavities 54. Also, by varying the contours of the curves 58, 62 and 63 (FIGURE 14a) the peripheral configuration of the candy sucker can be modified, all in accordance with different requirements and desires.

*Stick insertion*

Adjacent to the drum 52 in the sector shown in FIGURE 10 is a hopper 80 adapted to support a supply of sticks 81, the sticks lying parallel to the axis of the drum 52. Defining the bottom of the hopper is a wheel 82 provided with peripheral grooves 83 each of which is adapted to accommodate one of the sticks 81. The wheel 82 is mounted on a shaft 84 and is slowly rotated in the direction of the arrow 85 so that the periphery moves in tangential adjacent relation to the periphery of the drum 52. Curved guides 86 serve to hold the sticks 81 in the grooves 83 as they are conveyed, one by one, from the hopper to the drum 52.

There are twice as many grooves 83 in the wheel 82 as these are slots 59 (FIGURE 14a) in the drum 52. The wheel 82 is rotated at half the speed of the drum 52, so that the slots 83 are successively brought into adjacent relation to the slots 59. At this instant of time a stick 81 is transferred from the wheel 82 to the drum 52. The different speeds of the tangentially arranged wheels facilitate this transfer, because the greater speed of the drum 52 imparts a momentary spin to the stick being transferred.

A spring-pressed holder 87 engages each stick during a period of transfer, and causes a positive but yieldable force to be exerted upon each stick to make sure it is moved into one of the slots 59.

As the drum 52 rotates the sticks are held down by a fixed arcuate guide plate 88. Beneath this plate, and mounted within appropriate guides 89 formed in the drum periphery (see FIGURE 17) are stick-inserting elements 90 adapted to bear against the rear end of each stick and gradually advance it in an axial direction toward the mold cavity within which the candy body is to be compressed, as indicated in FIGURE 11. The parts 90 have cam followers at their outer end, bearing against and actuated by the operative face 91 of a cam 92, the retraction being controlled by the face 93 of a cam 94 (see FIGURE 20). By the action of these cams, the sticks 81 are successively pressed into the molded candy bodies, this action taking place simultaneously with the completion of the molding operation, i.e., at the position designated 95 in FIGURE 11. Thus, as the outer movable molding element 72 retracts under the influence of the spring 78, a sucker (designated 96 in FIGURE 11) is in readiness for wrapping.

*Transporting*

Each of the radial molding elements 53 is mounted for radial reciprocation, whereby an outward movement can be employed to discharge the finished suckers. This outward movement is controlled by the peripheral surface 97 of a cam 98 (see FIGURES 12 and 20) against which the rear ends 99 of the elements 53 come into rubbing contact as the drum rotates through the sector illustrated in FIGURE 12. During this time the pops or suckers are held in position by means of the curved guide rails 100 and 101, these rails being so positioned that the sticks 81 projecting from the suckers ride snugly between them.

There is no sudden discharge of the suckers from the drum 52, because even as the mold elements 53 move radially outward as indicated in FIGURE 12, the successive suckers are held by means of the guides 100, 101.

Arranged on a transport wheel 102, which is mounted on a shaft 103, are a series of peripheral slots 104. The wheel is so mounted that these slots come into substantially tangential relationship to the successive suckers at the lowest point of travel of the drum 52. The outward movement of each mold element 53 gently deposits each sucker stick into one of the slots 104, and the continuing rotation of the wheel 102 carries these suckers through approximately 180 degrees to the upper lap of a conveyor 105 which is similarly provided on its upper surface with receiving notches or slots 106.

During the travel of the suckers from the receiving position at the upper point of travel of the wheel 102 to the lower point of discharge, a curved guide or guides 107 bear gently against the sticks 81 to hold the suckers in position.

As soon as the discharging function of each mold element 53 has been fulfilled, it is withdrawn into normal disposition with respect to the drum 52. For this purpose an orifice 108 is formed in the rear end of each element 53 (see FIGURE 8) so that it comes into engagement with the end of the cam 194, as best indicated in FIGURE 12. The cam 194 bears against each surface 109 (FIGURE 8) to guide the element 53 radially inward to restore it to the positions depicted in FIGURE 8.

*Wrapping*

The travel of the conveyor 105 is indicated in FIGURE 2. It is guided over pulleys 110, 111, and conveys the suckers in succession, as indicated in FIGURE 13, to a wrapping station. The nature of the wrapping station will depend upon the wrapping material to be employed. One illustrative wrapping apparatus, useful for heat-sealable material, is illustrated in FIGURES 1 and 2, and the resultant product being shown in FIGURES 3 and 7.

Webs or strips of wrapping material 42 are guided from supply rolls 112 to and between a pair of cooperating heating rolls 113. Each of the latter is provided with spaced peripheral recesses appropriately shaped to fit snugly over and under the candy bodies, and the adjacent stick regions, as they are guided between the rollers 113. During this passage of each sucker, the webs above and beneath it are heat-sealed by the rollers 113, thus completely enclosing the sucker as indicated in FIGURE 3. Shortly thereafter, a knife or cutter 114 becomes effective and the completed wrapped suckers are discharged in sequence at the region 35 shown in FIGURE 1. In that figure, there is shown, by way of example, an auxiliary discharge conveyor 115 which leads the successive finished articles to a packaging table 116.

*Driving mechanism*

Figure 21:
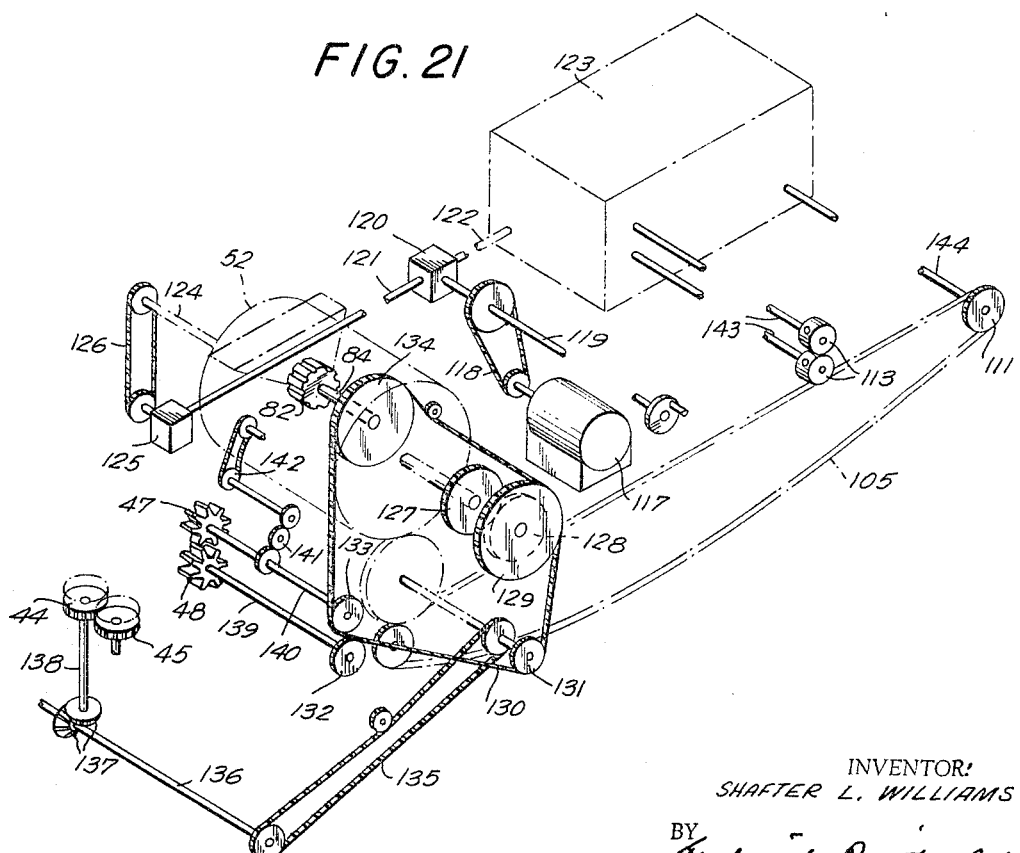
FIGURE 21 is a diagrammatic perspective of the driving instrumentalities.

All the wheels and elements described are obviously operated in predetermined timed relation. One illustrative driving mechanism is represented in FIGURE 21. The main driving motor 117 transmits power through a chain 118 to a main drive shaft 119. By means of suitable reduction gears or equivalent mechanism 120, power is transmitted through a drive shaft 121 to the sucker-making apparatus, and through a drive shaft 122 and further reduction gears 123 to the wrapping station.

The main drum 52 derives its rotative movement from a shaft 124 driven from the shaft 121 through a gear box 125 and a chain 126. Mounted on the opposite end of the shaft 125 is a gear 127 which transmits rotative movement to a meshing gear 128 mounted on the shaft of a sprocket 129. A chain 130 is driven by this sprocket and transmits power, successively, to sprockets 131, 132, 133 and 134.

The sprocket 131 is mounted on the shaft 103 (see FIGURE 12). The shaft 103 is connected by a chain 135, a shaft 136, and gears 137 to a vertical shaft 138 which drives one of the sizing rollers 44, 45.

The sprockets 132 and 133 are mounted on shafts 139 and 140 upon which the pinching or squeezing wheels 47, 48 are respectively mounted (see FIGURE 8).

Through gearing 141, power is transmitted from shaft 140 to the sprocket or wheel 142 upon which the guide chain 55 is mounted (see FIGURE 8).

The sprocket 134 drives the shaft 84 upon which the stick transfer wheel 82 is mounted.

Deriving power from the shaft 122, at the wrapping station, are shafts 143 upon which the heated sealing rollers 113 are mounted, and shaft 144 which carries the sprocket 111 that drives the conveyor chain 105.

*Alternative wrapping*

Should it be desired to wrap the individual suckers in material that does not readily lend itself to heat-sealing, an arrangement of the character shown in FIGURES 22–32 can be employed. In these figures, mechanism is shown which first envelops the candy section of each sucker within a sheet of wrapping material, and then engages the skirt of the enclosure adjacent to the stick and twists it around the stick. It is intended that this twisting will retain the wrapper in proper position.

FIGURE 22 shows the relationship of the alternative sucker transport, and the twist-wrapping apparatus, to the elements hereinbefore described in connection with the formation of the suckers themselves. Thus, FIGURE 22 depicts the rope 30, the stick hopper 80, the main drum 52, the carriers 71, for the outer molding die, and the inner radial die 53. In this case the suckers are successively ejected onto a transporting conveyor 145.

The conveyor 143 consists of a pair of parallel chains guided around sprockets 156, appropriately driven in timed relation to the other apparatus. The chains of the conveyor carry sucker carriers 147 at suitable spaced intervals, whereby one of these carriers is always in readiness to receive the sucker being ejected by the die 53 at the lowest point of travel of the drum 52.

Some of the details of the conveyor 145, and the carriers 147 supported on it are shown in FIGURES 23, 26 and 27.

Each carrier 147 is provided with a pair of upstanding tongues 148 against which the stick 81 of the sucker is adapted to rest when it is deposited upon the carrier 147. An intermediate tongue 149 is pivoted to the carrier at 150 and is constantly urged, by means of springs 151 in a "clockwise" direction, as viewed in FIGURES 22 and 27. The tongue 149 is provided with a tail 152 at the opposite side of the pivot axis 150. During the travel of the carriers 147 along the upper lap (leftward as viewed in FIGURES 22 and 27) the tails 152 ride upon the upper surface of a cam rail 153, being thus retained in the retracted disposition shown in dotted lines in FIGURE 27. Immediately after a sucker has been deposited upon the carrier 147, the tail 152 encounters the depressed part 154 of the rail 153, whereupon the springs 151 become effective to swing the tongue 149 into the full-line position shown in FIGURE 27. This serves to clamp the stick 81 against the tongues 148.

In this positively engaged manner, each successive sucker is conveyed downwardly to the wrapping conveyor 155.

The conveyor 155 is also composed of a pair of parallel chains suitably guided upon sprockets 156 and 157.

Mounted in series upon the conveyor 155 are wrapping units 158 which come into position successively, to receive the suckers that are carried around by the conveyor 145.

As the units 158 approach the station at which suckers are successively transferred to them, they travel past an apparatus which deposits a piece of wrapping material, of proper size. This apparatus may consist, for example, of a table 159 along which a continuous supply 160 of wrapping material is advanced by means of a feed roller 161. A knife or cutter 162 cuts off selected lengths of wrapping material which are thereupon guided by means of the plate 163 into a disposition on top of each wrapping unit 158.

As each piece of wrapping material is deposited upon one of the units 158, one of the padded elements 164, carried by the special belt 165 bears down upon the corner of the wrapper to hold it in place temporarily. Immediately thereafter an appropriate cam rail, similar to the rail 153, operates to swing the holding tongue 149 away from the fixed tongues 148, so that the engaged sucker is deposited upon the element of wrapping material. Thereupon, the wrapping procedure is initiated. The preliminary steps are best illustrated in FIGURES 28-32.

Each wrapping unit consists of a platform 166 supported upon a post 167 adapted to move up and down, the movements being partially controlled by a compression spring 168. Pivoted to the platforms 166 at 169 is a folding arm 170 to which lateral wings 171 are secured. As each wrapping unit 158 travels along, the lower part of the post 167 encounters a suitable cam surface 172 (FIGURE 22) and the arm 170 encounters an appropriately curving cam rail 173.

With reference to FIGURE 29, the folding arm 170 is normally in the dotted position indicated at 174, and the platform 166 is in an elevated position. The sucker rests upon the platform 166, with the wrapping element 175 underlying it. By encounter with the rail 173, the arm 174 is brought first into the position indicated at 176, as a result of which the wings 171 bend the wrapper upwardly through approximately 90 degrees, bringing it to the position indicated at 177. By further encounter with the rail 173, the arm 170 is swung into the full-line position shown in FIGURE 29, as a result of which the upstanding section of the wrapper is brought downwardly onto the top surface of the candy element and tucked around its sides. At this stage, the cam rail 172 becomes effective to cause the post 167, and the platform 166, to move downwardly. The platform moves downwardly between a pair of upstanding guides 178, as a result of which the wrapper is folded upwardly along the opposite sides of the candy, as indicated in FIGURES 31 and 32. Thereupon, cam-actuated elements (not shown) become effective to fold down first one side, then the other side, of the wrapper. This results in completely enclosing the candy element, except that the wrapper is still provided with a skirt which overhangs the stick. To complete the wrapping, this skirt is engaged by the mechanism shown at the right end of FIGURE 22, and shown most clearly in FIGURES 24 and 25, whereby each skirt is engaged and twisted around the stick. The suckers, thus completely wrapped, are then deposited onto a receiving belt or conveyor 179, as shown in FIGURE 22.

The twisting mechanism consists of a wheel-like device mounted for rotation on the shaft 180 of the sprocket 157. Extending radially from a hub 181 are carriers 182 upon which twisting units 183 are rotatably mounted. Each unit 183 is formed with an elongated toothed section 184, constituting a planet gear in constant engagement with a fixed sun gear 185 with its teeth on its inner surface. Thus, as the shaft 180 rotates, each of the units 183 rotates. Axial movement of each unit 183 is nevertheless permitted.

The axial movements of the elements 183 are controlled by a cam rail 186 constantly engaged by follower arms 187 pivoted at one end 188 to the hub 181 and at the other end to one of the units 183.

Mounted within each unit 183, for longitudinal reciprocation with respect thereto, is a rod 189. The axial movements of this rod are controlled by a spring 190 and a cam rail 191. At its forward end, the rod 189 is linked at 192 to a pair of divergent arms 193. Each of the latter is pivoted at its forward end to a bellcrank 195, pivoted at its central region as indicated at 196. Carried by the outer arms of the bellcranks 195 are twisting jaws 197. As best indicated in FIGURE 25, each of these jaws consists of a pair of parallel rods between whose ends a spring element 198 is carried.

In its forwardly advanced position, the rod 189 separates the twisting fingers 197, 198, as shown in the lower part of FIGURE 24. Whenever the rod 189 is retracted with respect to the unit 183, the fingers come together as indicated in the other part of FIGURE 24.

The cam rails 186 and 191 are so arranged and contoured that as each sucker reaches the twisting station the twisting fingers come forward to engage the skirt of the wrapper, and are brought together to grip the skirt between them. Then, as the twisting wheel continues to rotate, the fingers 197 are rotated so that by the time they have reached the lowest point of travel the wrapper has been completely twisted around the stick. They then release the wrapper and withdraw to the position shown in the lower part of FIGURE 24.

In general it will be understood that many of the details herein described and illustrated may be modified by those skilled in the art without necessarily departing from the spirit and scope of the invention as expressed in the appended claims.

What is claimed is:

1. Apparatus for making soft-center candy suckers, comprising
   (a) means for engaging an advancing candy rope and progressively pinching it transversely at successive intervals to form pillow-shaped sections connected in series by attenuated fins, said engaging means comprising a pair of cooperating wheels having blunted teeth meshing face to face but not touching, and means for rotating said wheels in opposite directions, said candy rope being fed into the nip of said wheels,
   (b) means for engaging successive fins and pinching the ends toward each other to a degree which ultimately severs each fin,
   (c) means adapted to engage successive separated sections and mold them to desired contour,
   (d) means for inserting a stick into each section, and
   (e) mechanism for driving the foregoing means (a)–(d) in predetermined timed relation.

2. Apparatus as defined in claim 1, the teeth on one of said wheels being appreciably longer than those on the other so that said pillow-shaped sections accommodate themselves in the spaces between said longer teeth.

3. Apparatus as defined in claim 1, including a rotating drum arranged adjacent to means (a) for receiving said pinched rope on its peripheral surface, said drum serving as a support for said means (b), (c) and (d).

4. Apparatus as defined in claim 3, in which said means (b) comprises pairs of relatively movable pinchers, one set of pincher elements being positionally fixed on said drum periphery, a complementary set being mounted on said peripheral surface for movements toward and away from the fixed set in a direction parallel to the axis of drum rotation.

5. Apparatus as defined in claim 4, in which said means (c) comprises pairs of relatively movable dies, one set of die elements being normally positionally fixed in radial dispositions with the outer ends thereof exposed on said peripheral surface, a complementary set being mounted on said peripheral surface for movements in radial directions toward and away from the fixed set.

6. Apparatus as defined in claim 5, in which there are common supports for the movable pincher elements and the movable die elements.

7. Apparatus as defined in claim 5, including cam means for controlling the movements of the movable pincher elements toward and away from the fixed set, and other cam means for controlling the movements of the movable die elements toward and away from the fixed set.

8. Apparatus as defined in claim 3, wherein said drum has a plurality of grooves formed therein, said grooves being disposed parallel to the axis of rotation of the drum, and said means (d) comprises a stick hopper, a mechanism for transferring sticks from said hopper into successive grooves, pushers movably mounted on said drum, and cam means for actuating said pushers at predetermined times during drum rotation.

9. Apparatus as defined in claim 5, in which said one set of die elements is mounted for limited radial reciprocation, and cam means for moving said die elements radially outward at a predetermined time during drum rotation, for expulsion of the molded suckers.

10. Apparatus for making soft-center candy suckers, comprising
   (a) means for engaging an advancing candy rope and progressively pinching it transversely at successive intervals to form pillow-shaped sections connected in series by attenuated fins,
   (b) means for engaging successive fins and pinching the ends toward each other to a degree which ultimately severs each fin,
   (c) means adapted to engage successive separated sections and mold them to a desired contour,
   (d) means for inserting a stick into each section,
   (e) mechanism for driving the foregoing means (a)–(d) in predetermined timed relation,
   (f) means driven in said timed relation by said mechanism for transporting the suckers, as they are completed, to a wrapping station, and
   (g) means driven in said timed relation by said mechanism at the wrapping station for enclosing the candy section of each sucker within a wrapper, said means (f) comprising a rotating wheel provided with peripheral stick-holding grooves parallel to the wheel axis and adapted successively to receive and accommodate the sticks of the completed suckers, and a conveyor extending from said wheel to the wrapping station and provided with similar stick-holding grooves, said wheel and conveyor being so arranged that the stick-holding grooves come into successive registry so that the suckers are controllably transferred from the wheel to the conveyor.

References Cited by the Examiner
UNITED STATES PATENTS

| | | | |
|---|---|---|---|
| 1,958,380 | 5/1934 | Vottger et al. | 107—8 |
| 2,278,005 | 3/1942 | VanVeen | 53—200 |
| 2,667,847 | 2/1954 | Carris et al. | 107—8 |
| 2,705,857 | 4/1955 | Fox et al. | 107—8 X |
| 2,987,015 | 6/1961 | Brook | 107—8 |

WALTER A. SCHEEL, *Primary Examiner.*

WILLIAM I. PRICE, J. SHEA, *Examiners.*